(12) United States Patent
Sanada et al.

(10) Patent No.: US 7,152,565 B2
(45) Date of Patent: Dec. 26, 2006

(54) VIBRATION PREVENTION STRUCTURE IN ENGINE

(75) Inventors: Makoto Sanada, Wako (JP); Tatsuo Suzuki, Wako (JP); Katsuhiro Kubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/158,971

(22) Filed: Jun. 22, 2005

(65) Prior Publication Data

US 2006/0042585 A1   Mar. 2, 2006

(30) Foreign Application Priority Data

Aug. 27, 2004   (JP)   ............... 2004-248625

(51) Int. Cl.
*F02B 75/06* (2006.01)
*F16F 15/14* (2006.01)

(52) U.S. Cl. ................... 123/192.1; 74/574.2

(58) Field of Classification Search ............. 123/192.1, 123/192.2; 74/572.2, 572.3, 572.4, 574.2
See application file for complete search history.

(56) References Cited

U.S. PATENT DOCUMENTS 2,348,941 A * 5/1944 Ware ......................... 74/574.3
3,979,804 A * 9/1976 McCormick ................. 74/603

FOREIGN PATENT DOCUMENTS

JP        61149635 A  *  7/1986
JP        2002-213302     7/2002
JP        2003-293701    10/2003

* cited by examiner

*Primary Examiner*—Noah P. Kamen
(74) *Attorney, Agent, or Firm*—Hamre, Schumann, Mueller & Larson, PC (57) ABSTRACT

In an engine having a propeller mounted on one end of a crankshaft, the vibrations on an end portion of the crankshaft opposite to the propeller are effectively suppressed with a pair of vibration pendulum type weights arranged outside the crankcase whereby it is possible to easily perform a change of the vibration suppression structure in conformity with the property of the propeller.

6 Claims, 6 Drawing Sheets

VIBRATION PREVENTION STRUCTURE IN ENGINE

FIELD OF THE INVENTION

The present invention relates to an engine in which at least two bearing portions which rotatably support at least a pair of crank journals provided to a crankshaft are mounted on a crankcase, both ends of the crankshaft are projected from the outermost bearing portions which are arranged along an axis of the crankshaft out of the respective bearing portions, and a propeller is mounted on one end of the crankshaft, and more particularly to improvement of the vibration prevention structure for suppressing the vibrations of a crankshaft.

BACKGROUND OF THE INVENTION

An engine for an airplane which mounts a propeller on one end of a crankshaft is known by JP-A-2002-213302, and a vibration prevention structure which suppresses the vibrations of a crankshaft is disclosed in JP-A-2003-293701.

Here, as disclosed in the above-mentioned JP-A-2002-213302, the crankshaft which mounts the propeller on one end thereof has a large possibility of generating torsional vibrations. Particularly, the vibrations are increased at a portion remote from the propeller and hence, it is necessary to suppress the torsional vibrations. On the other hand, in the engine which is disclosed in the above-mentioned JP-A-2003-293701, a damper weight is mounted on a crank web of the crankshaft to obtain a vibration prevention effect. In applying such vibration prevention structure to the crankshaft which mounts the propeller on one end thereof, the vibration reduction effect on an end portion of the crankshaft opposite to the propeller is small and, at the same time, with respect to an operation which is performed at the time of changing the vibration suppression structure in conformity with properties of the propeller, a large-scale operation such as dissembling of the crank case or the like becomes necessary and such an operation can not be performed easily.

The present invention has been made under such circumstances and it is an object of the present invention to provide the vibration prevention structure in an engine which can effectively suppress the vibrations of a crankshaft at an end portion thereof opposite to a propeller and, at the same time, can easily perform a change of the vibration suppression structure in conformity with properties of the propeller.

SUMMARY OF THE INVENTION

To achieve the above-mentioned object, the present invention is directed to an engine in which at least two bearing portions which rotatably support at least a pair of crank journals provided to a crankshaft are mounted on a crankcase, both ends of the crankshaft are projected from the outermost bearing portions which are arranged along an axis of the crankshaft out of the respective bearing portions, and a propeller is mounted on one end of the crankshaft, wherein the improvement is characterized in that a vibration suppressor which is provided with a pair of vibration pendulum type weights arranged outside the crankcase is mounted on the other end portion of the crankshaft.

Since the vibration suppressor is mounted on the end portion of the crankshaft opposite to the propeller, it is possible to effectively reduce the vibrations on the end portion of the crankshaft opposite to the propeller. Further, since the pair of vibration pendulum type weights provided to the vibration suppressor are arranged outside the crankcase, at the time of changing the vibration suppressor in conformity with a properties of the propeller, it is unnecessary to perform a large-scale operation such as dissembling of the crankcase or the like whereby the vibration suppressor can be easily changed thus facilitating the inspection and the maintenance.

In addition, the constitution of the invention described above may include a cover which covers the vibration suppressor cooperatively with the crankcase detachably mounted on the crankcase, and a support portion which rotatably supports the vibration suppressor mounted on the other end portion of the crankshaft is mounted on the cover.

By supporting a shaft end of the crankshaft opposite to the propeller while protecting the vibration suppressor, it is possible to obtain the more excellent vibration reduction effect.

The invention may also include on the crankcase, a detachably mounted cover which integrally includes a pump mounting portion for mounting a pump housing which is provided to a water pump driven by the crankshaft, and the vibration suppressor is covered with the crankcase and the cover. It is possible to protect vibration suppressor by reducing the number of parts.

Further, the vibration suppressor may be configured such that on a pair of support arm portions which are arranged along one diametrical line of the crankshaft and are integrally rotated with the crankshaft, the pair of weights are supported by way of pins which have axes thereof arranged in parallel with the crankshaft and are inserted into the support arm portions and the weights, and removal prevention members which prevent the removal of the pins from the support arm portions are detachably mounted on the support arm portions.

The removal prevention member which prevents the removal of the pin from the support arm portion is detachably mounted on the support arm portion and hence, the exchange of pins having different outer diameters which becomes necessary to change the order of vibration or the like is facilitated whereby it is possible to miniaturize the vibration suppressor by arranging both weights on a same rotating surface.

Further, the orders of vibration of both weights may be set different from each other. By allowing the pair of weights to have the orders of vibration different from each other, it is possible to further enhance the vibration prevention property of the crankshaft.

DETAILED DESCRIPTION OF THE INVENTION

Figure 1:
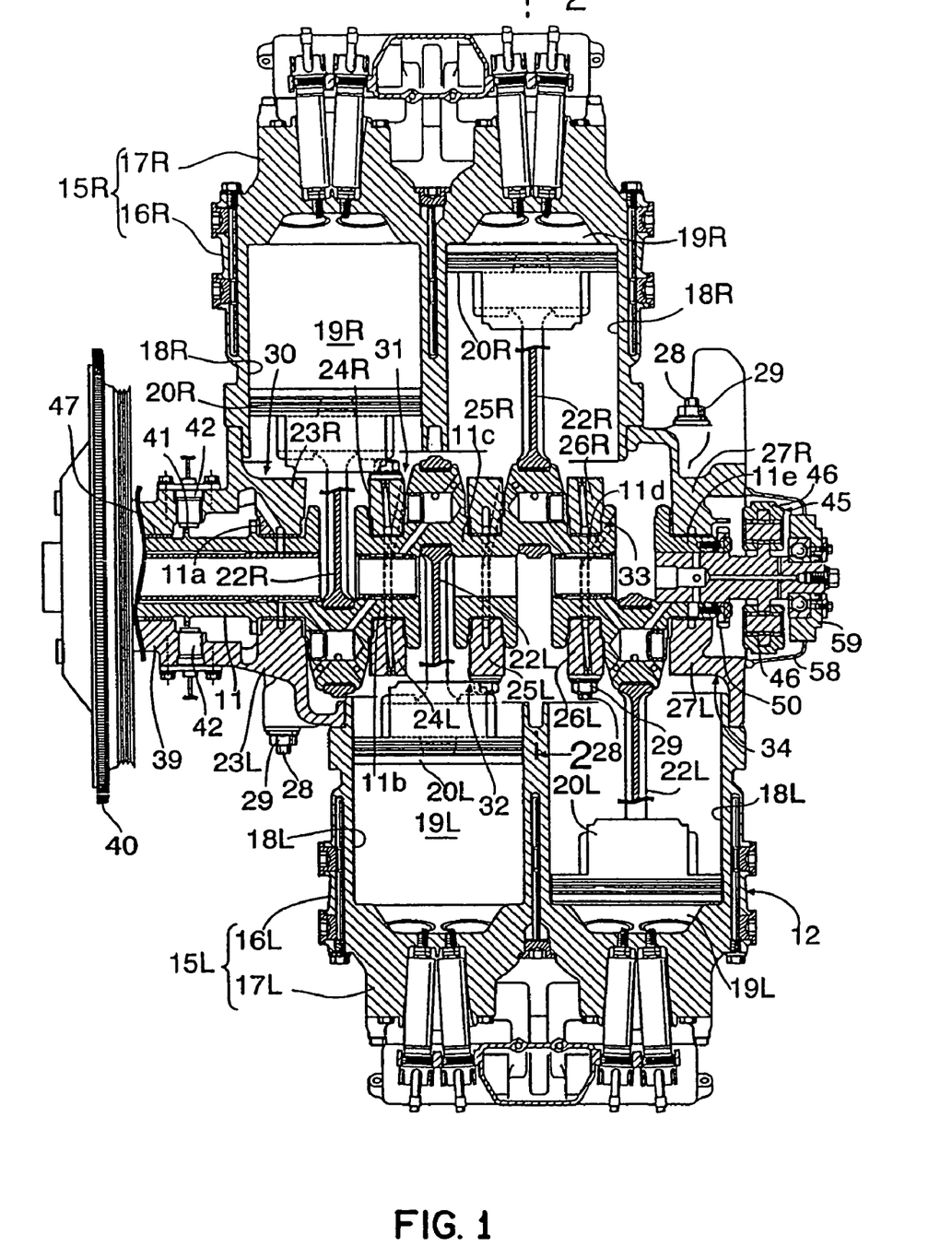
FIG. 1 A transverse plan view of an engine of the first embodiment.
Figure 2:
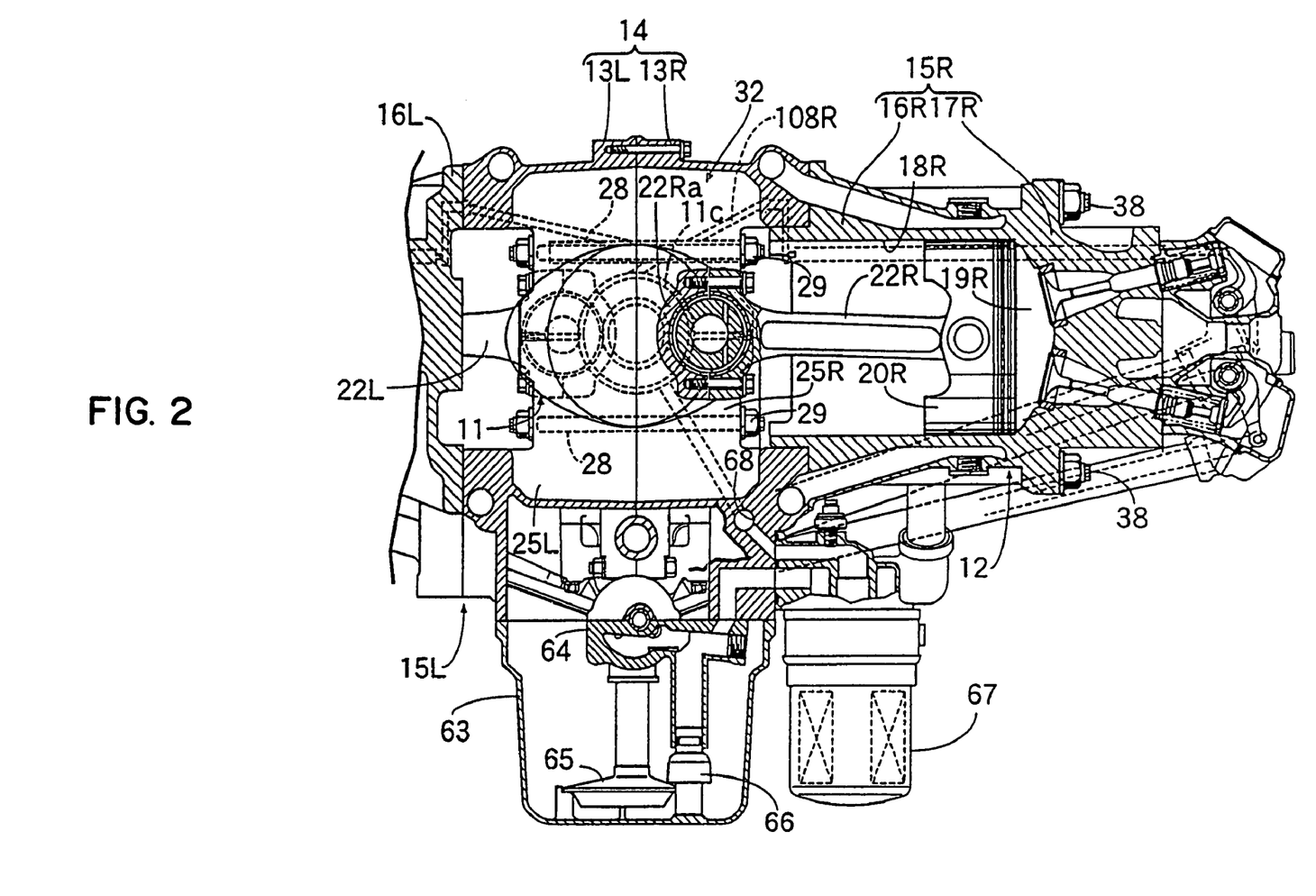
FIG. 2 A cross-sectional view taken along a line 2—2 in FIG. 1.

In FIG. 1 and FIG. 2, a 4-cycle horizontal-opposed-type 4-cylinder engine is mounted on an airplane, for example, wherein the engine is housed in the inside of a front cowl of a body of the airplane in a state that an axis of a crankshaft 11 is arranged along the fore-and-aft direction, and a spinner having a plurality of propellers is coaxially coupled to the crankshaft 11.

An engine body 12 of the engine includes a crankcase 14 which is formed by joining a left case half body 13L which is arranged on a left side when the engine is viewed from a rear side and a right case half body 13R which is arranged on a right side when the engine is viewed from the rear side, and left and right cylinder blocks 15L, 15R which are respectively arranged on left and right sides of the crankcase 14.

The left cylinder block 15L is constituted by integrally forming a left cylinder barrel 16L and a left cylinder head 17L, the right cylinder block 15R is constituted by integrally forming a right cylinder barrel 16R and a right cylinder head 17R, and the left and right cylinder barrels 16L, 15R are joined to the crankcase 14.

On the cylinder barrels 16L, 16R of both cylinder blocks 15L, 15R, respective pairs of cylinder bores 18L, 18L; 18R, 18R which face each other in an opposed manner while sandwiching the crankshaft 11 from both sides are formed in a state that the cylinder bores 18L, 18L; 18R, 18R are arranged in parallel in the axial direction of the crankshaft 11 and, at the same time, offset each other in the axial direction. In the respective cylinder bores 18L, 18R, pistons 20L, 20R are slidably fitted such that combustion chambers 19L, 19R are formed between respective cylinder heads 17L, 17R and the pistons 20L, 20R.

Both cylinder blocks 15L, 15R are arranged in an opposed manner with axes of the above-mentioned cylinder bores 18L, 18R arranged substantially horizontally, while the crankshaft 11 which is connected with the above-mentioned pistons 20L, 20R by way of connecting rods 22L, 22R is rotatably supported on the above-mentioned crankcase 14.

On the left case half body 13L of the crankcase 14, at both front and rear sides of the above-mentioned connecting rods 22L, a front journal support wall 23L, a first intermediate journal support wall 24L, a second intermediate journal support wall 25L, a third intermediate journal support wall 26L and a rear journal support wall 27L which support left half portion of the crankshaft 11 are formed in a spaced apart manner in the fore-and-aft direction. On the right case half body 13R of the crankcase 14, at both front and rear sides of the above-mentioned connecting rods 22R, a front journal support wall 23R, a first intermediate journal support wall 24R, a second intermediate journal support wall 25R, a third intermediate journal support wall 26R and a rear journal support wall 27R which support right half portion of the crankshaft 11 are formed in a spaced apart manner in the fore-and-aft direction.

The above-mentioned respective journal support walls 23L to 27L, 23R to 27R are fastened together by respective pairs of stud bolts 28 and nuts 29 which sandwich the crankshaft 11 from above and below thus respectively constituting a front bearing portion 30, a first intermediate bearing portion 31, a second intermediate bearing portion 32, a third intermediate bearing portion 33 and a rear bearing portion 34 which rotatably support the crankshaft 11.

Further, the crankcase 14 and the left and right cylinder blocs 15L, 15R are, using a plurality of fastening bolts 38 which have axes thereof arranged parallel to axes of the above-mentioned cylinder bores 18L, 18R, fastened while being compressed in the direction along the axes of these fastening bolts 38.

The crankshaft 11 includes at least a pair of crank journals 11a, 11b, 11c, 11d, 11e. In this embodiment, the crankshaft 11 includes five crank journals 11a, 11b, 11c, 11d, 11e in order from front to behind along an axis thereof.

The respective crank journals 11a to 11e of the above-mentioned crankshaft 11 are respectively rotatably supported on the front bearing portion 30, the first intermediate bearing portion 31, the second intermediate bearing portion 32, the third intermediate bearing portion 33 and the rear bearing portion 34 of the crankcase 14 respectively.

Both ends of the crankshaft 11 project outwardly from the front and rear bearing portions 30, 34 which are arranged at outermost ends along the axis of the crankshaft 11, a support sleeve portion 39 which surrounds a crankshaft body 35 of the crankshaft 11 at a position in front of the above-mentioned front bearing portion 11a is integrally formed with the crankcase 14, and the crankshaft body 35 is also rotatably supported by the support sleeve portion 39. Further, the front end of the crankshaft 11 is projected frontwardly from the above-mentioned support sleeve portion 39, a ring gear 40 is fixed to the front end of the crankshaft 11, and a spinner (not shown in the drawings) is mounted on the ring gear 40 coaxially.

A pinion of a starting device (not shown in the drawing) can be meshed with the above-mentioned ring gear 40 and hence, a rotational power is imparted to the ring gear 40, that is, the crankshaft 11 from the starting device. Further, in the inside of the support sleeve portion 39, a plurality of projections 41 are formed on the crankshaft 11 in a projecting manner equidistantly in the circumferential direction, and a pair of crank angle sensors 42, 42 which are provided for detecting crank angles using these projections 41 are mounted on the support sleeve portion 39 in a state that a phase of 180° is formed between the crank angle sensors 42, 42.

Figure 3:
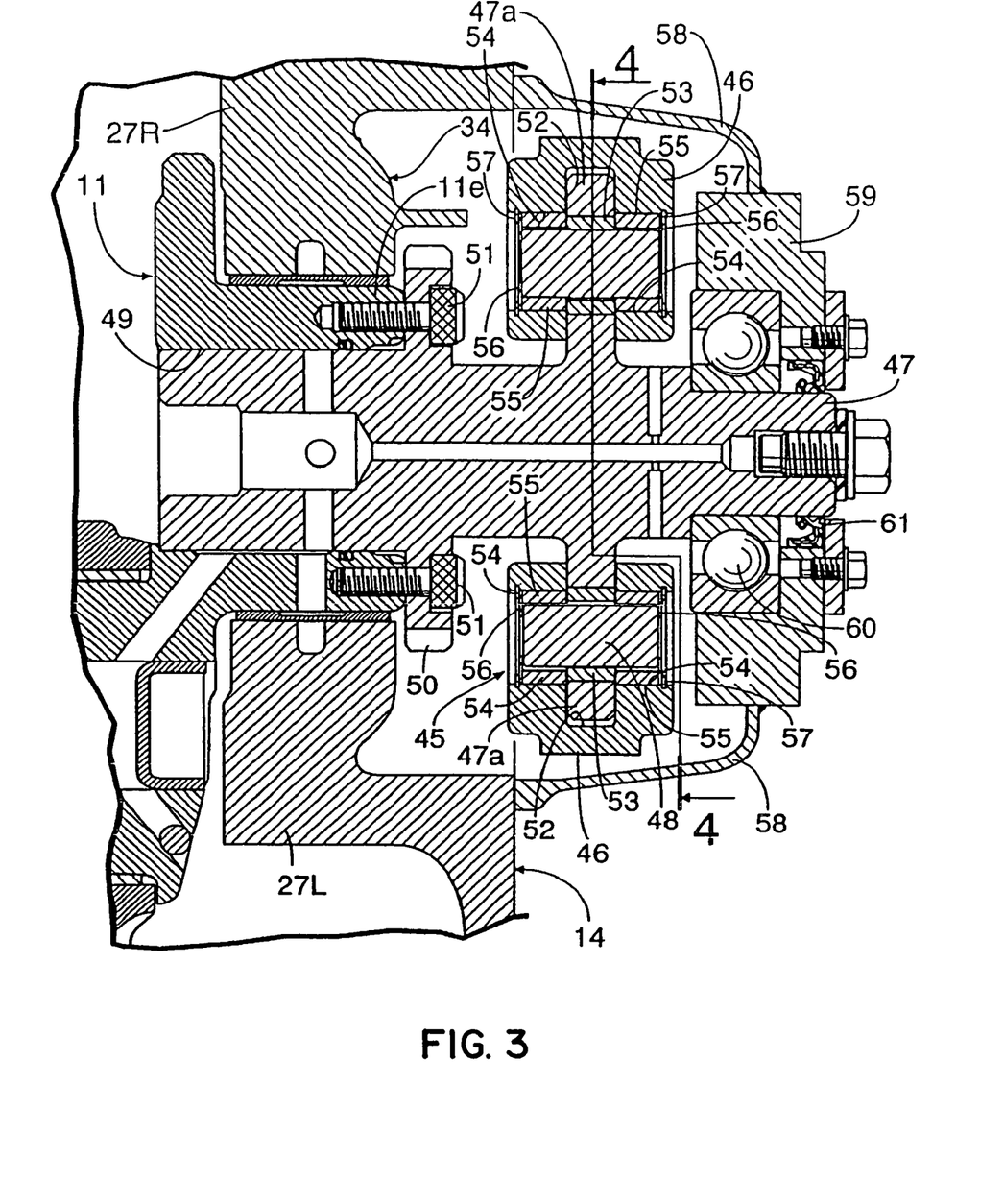
FIG. 3 A cross-sectional view which enlarges a portion in FIG. 1 on a rear portion side of a crankshaft.
Figure 4:
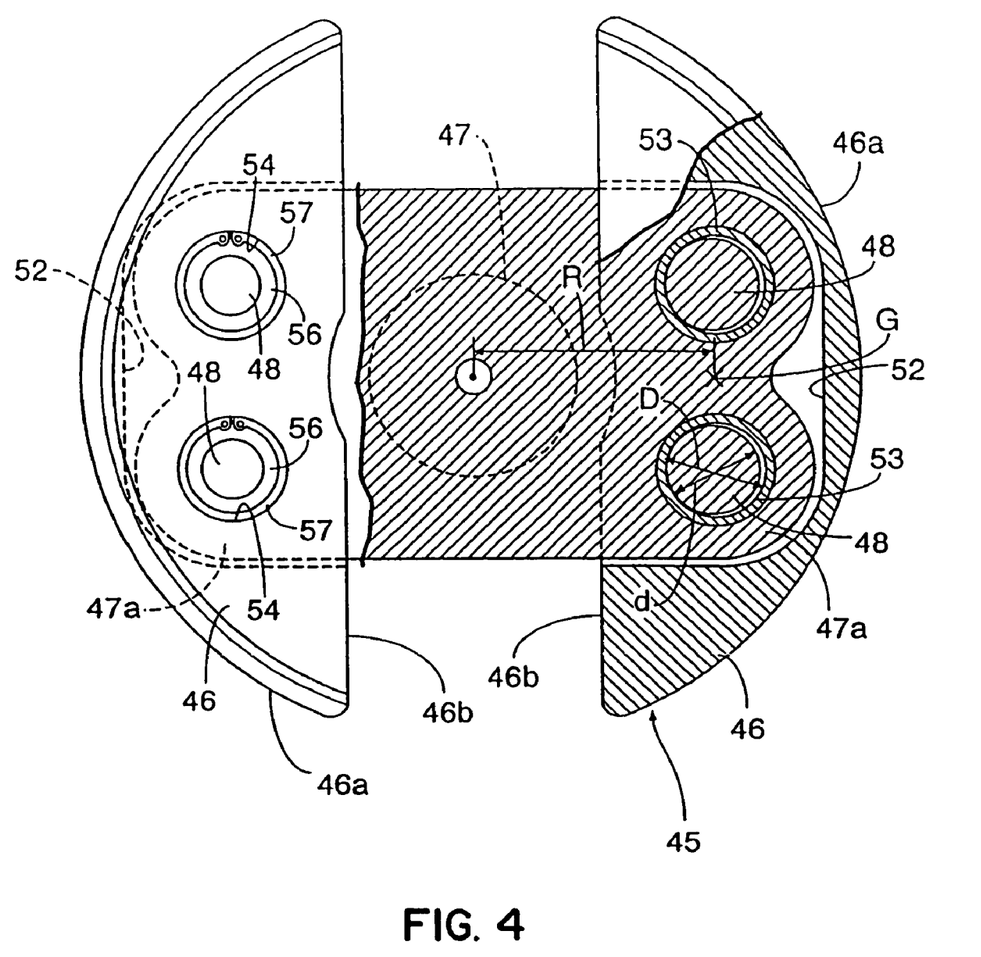
FIG. 4 A cross-sectional view taken along a line 4—4 in FIG. 3.

To explain the embodiment also in conjunction with FIG. 3, FIG. 4, the rear end of the crankshaft 11 projects rearwardly from the rear bearing portion 34 and a vibration suppressor 45 is mounted on a rear end portion of the crankshaft 11. The vibration suppressor 45 includes a shaft member 47 which integrally forms a pair of support arm portions 47a, 47a which project to both sides along one diametrical line on an axially intermediate portion thereof and has one end portion thereof coaxially mounted on a rear end portion of the above-mentioned crankshaft 11, and a pair of vibration pendulum type weights 46, 46 which are supported on the above-mentioned both support arm portions 47a, 47a by way of respective pairs of pins 48, 48, wherein both weights 46, 46 are arranged outside a rear portion of the crankcase 14.

A fitting hole 49 is coaxially formed in a rear end portion of the above-mentioned crankshaft 11 and one end portion of the above-mentioned shaft member 47 is fitted in the fitting hole 49. Further, on the shaft member 47, an auxiliary drive gear 50 which is brought into contact with the other end surface of the above-mentioned crankshaft 11 is integrally formed in a state that the auxiliary drive gear 50 projects outwardly in the radial direction. By fastening the auxiliary drive gear 50 to the other end surface of the crankshaft 11 using a plurality of bolts 51, one end portion of the shaft member 47 is coaxially joined to the other end portion of the crankshaft 11. That is, the above-mentioned both support arm portions 47a, 47a are arranged along one diametrical line of the crankshaft 11 and are integrally rotated with the crankshaft 11.

The above-mentioned weight 46 is formed in a bow shape which includes an arcuate surface 46a and a flat surface 46b which connects both ends of the arcuate surface 46a on an outer periphery thereof, and a recessed portion 52 which allows the insertion of a distal end portion of the above-mentioned support arm portion 47a is formed in the weight 46 in a state that the recessed portion 52 opens in the above-mentioned flat surface 46b.

In a portion of the support arm portion 47a which is inserted into the inside of the above-mentioned recessed portion 52, a pair of cylindrical collars 53, 53 which are arranged in parallel while having axes parallel to the axis of the crankshaft 11 are pushed in a state that both ends of the collars 53, 53 become coplanar with both side surfaces of the support arm portion 47a. Further, mounting holes 54, 54 which individually correspond to the above-mentioned collars 53, 53 are formed in the above-mentioned weight 46 on both sides of the support arm portion 47a. In respective mounting holes 54, 54, cylindrical collars 55, 55 which have an inner diameter equal to a diameter of the above-mentioned above-mentioned recessed portion 52. The respective collars 55, 55 have an axial length thereof predetermined such that the other ends thereof are positioned inwardly from outer ends of the above-mentioned mounting holes 54, 54.

An outer diameter of the pins 48 which have axes thereof arranged parallel to the axis of the crankshaft 11 is predetermined to be smaller than the inner diameter of the above-mentioned collars 53, 54, wherein the pins 48 are inserted into the collars 53 of the support arm portion 47a and collars 55, 55 which are arranged on both sides of the collar 53. Further, an axial length of the pin 48 is predetermined such that both ends of the pin 48 assume the same position as outer ends of the collars 55, 55. In the respective mounting holes 54, 54, disc-like thrust plates 56, 56 which receive both ends of the above-mentioned pin 48 are inserted. By sandwiching these thrust plates 56, 56 between outer ends of the above-mentioned collars 55, 55, stopper rings 57, 57 which constitute removal preventing members which prevent the removal of the above-mentioned pin 48 from the support arm portions 47a, 47b can be detachably mounted in inner surfaces close to outer ends of the mounting holes 54, 54.

On an outer surface of the rear portion of the crankcase 14, a cover 58 which covers the vibration suppressor 45 with the crankcase 14 is detachably mounted fastening using bolts not shown in the drawing. A support portion 59 is formed on the cover 58 by welding a member separate from the cover 58, for example. The other end of the shaft member 47 which constitutes a portion of the vibration suppressor 45 is rotatably supported on the above-mentioned support portion 59 by way of the ball bearing 60 and an annular seal member 61 is interposed between the shaft member 47 and the support portion 59 outside the ball bearing 60.

Here, assuming a distance between a position G of center of gravity of the weight 46 and a position between axes of the crankshaft 11 and the bearing portion 47 as R, an outer diameter of the pin 48 as d, an inner diameter of collars 53, 53 having the same inner diameter as D, a space between the collars 53, 55 and the pin 48 as L(=D−d), an engine rotational speed (cycle/second) as N and, a vibration frequency (cycle/second) as f, (f/N) which corresponds to the orders of vibration of the weights 46 are obtained by a formula $\{f/n=(R/L)^{1/2}\}$. By changing the outer diameter d of the pin 48, it is possible to change the orders of vibration of the weights 46.

Accordingly, to allow the orders of vibration of the pair of weights 46, 46 to be predetermined different from each other, the outer diameters d of the pins 48, 48 which support both weights 46, 46 on the support arm portions 47a, 47a are predetermined from each other.

To focus on FIG. 2, an oil pan 63 is joined to a lower portion of the crankcase 14, and a driving force is transmitted to an oil pump 64 which has a portion thereof accommodated in the inside of the oil pan 63 from the above-mentioned auxiliary drive gear 50. Oil in the inside of the oil pan 63 is sucked into the oil pump 64 by way of an oil strainer 65, a relief valve 66 is interposed between a discharge opening of the oil pump 64 and the oil pan 63, the oil discharged from the oil pump 64 is purified by an oil filter 67 and, thereafter, is guided to a main gallery 68 of the crankcase 14.

Next, to explain the manner of this embodiment, for example, in the 4-cylinder engine which is constituted in a 4-cycle horizontal-opposed type for an airplane, five bearing portions 30 to 34 which rotatably support five crank journals 11a to 11e provided to the crankshaft 11 are mounted on the crankcase 14. Among respective bearing portions 30 to 34, both ends of the crankshaft 11 are projected from the outermost bearing portions 30, 34 along the axis of the crankshaft 11. Here, while the propeller is mounted on one end of the crankshaft 11, on the other end portion of the crankshaft 11, the vibration suppressor 45 which is provided with the pair of vibration pendulum type weights 46, 46 which are arranged outside the rear portion of the crankcase 14 is mounted.

Accordingly, the vibration on the end portion of the crankshaft 11 opposite to the propeller can be effectively reduced. Further, the pair of vibration pendulum type weights 46, 46 which the vibration suppressor 45 includes are arranged outside the crankcase 14 and hence, at the time of changing the vibration suppressor 45 in conformity with the properties of the propeller, the large-scale operation such as the dissembling of the crankcase 14 becomes unnecessary whereby the vibration suppressor 45 can be easily changed and the inspection and the maintenance can be performed easily.

Further, on the crankcase 14, the cover 58 which covers the vibration suppressor 45 with the crankcase 14 in a cooperative manner is detachably mounted. On the cover 58, the support portion 59 which rotatably supports the vibration suppressor 45 mounted on the other end portion of the crankshaft 11 is mounted. Accordingly, by supporting the vibration suppressor 45 on the side opposite to the crankshaft 11 while protecting the vibration suppressor 45, it is possible to obtain the more excellent vibration reduction effect.

Further, the vibration suppressor 45 is configured such that on a pair of support arm portions 47a, 47a which are arranged along one diametrical line of the crankshaft 11 and are integrally rotated with the crankshaft 1, the pair of weights 46, 46 are supported by way of pins 48, 48 which have axes thereof arranged in parallel with the crankshaft 11 and are inserted into the support arm portions 47a, 47a and the weights 46, and stopper rings 57 which prevent the removal of the pins 48 from the support arm portions 47a are detachably mounted on the support arm portions 47a. Accordingly, it is possible to easily exchange the pins 48 which have different outer diameters for changing the orders of vibration, and both weights 46 can be arranged on the same rotational surface whereby the vibration suppressor 45 can be minimized.

Further, by setting the orders of vibration of both weights 46, 46 different from each other, the vibration prevention property of the crankshaft 11 can be enhanced.

Figure 5:
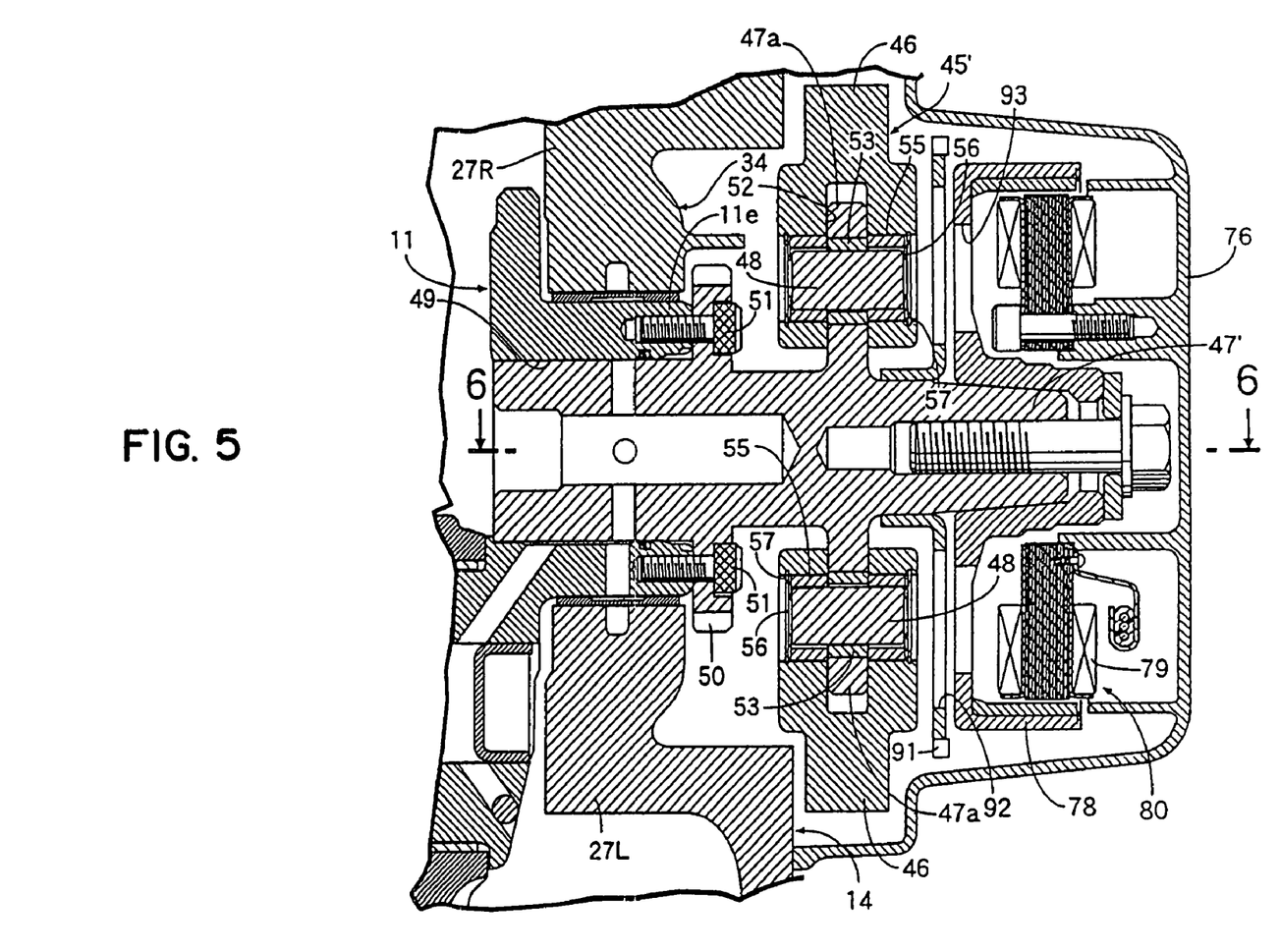
FIG. 5 A cross-sectional view corresponding to FIG. 4 of the second embodiment.
Figure 6:
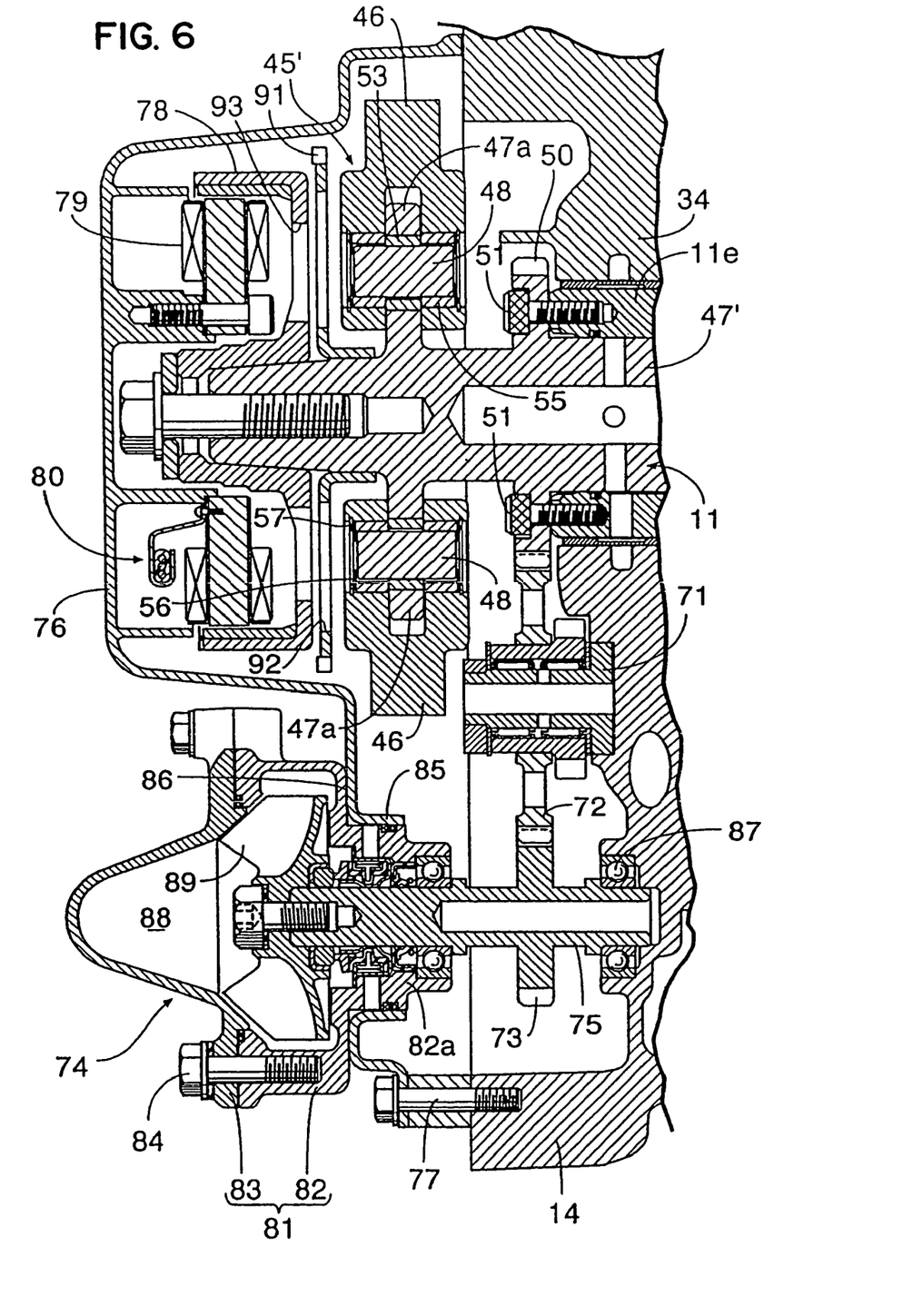
FIG. 6 A cross-sectional view taken along a line 6—6 in FIG. 5.

FIG. 5 and FIG. 6 show the second embodiment of the present invention, wherein FIG. 5 is a cross-sectional view corresponding to FIG. 3 of the first embodiment and FIG. 6 is a cross-sectional view taken along a line 6—6 in FIG. 5.

On an end portion of a crankshaft 11, a shaft member 47' which integrally includes a pair of support arm portions 47a, 47a on an axial intermediate portion and has an one end portion thereof coaxially formed on a rear end portion of the crankshaft 11, and a pair of vibration pendulum type weights 46, 46 which are supported on both support arm portions 47a, 47a outside a rear portion of a crankcase 14 by way of respective pairs of pins 48, 48. The joining structure of one end portion of the shaft member 47' to the crankshaft 11 and the support structure of the weights 46, 46 on the support arm portions 47a, 47a of the shaft member 47' are substantially equal to the corresponding structures of the first embodiment and hence, their explanation is omitted.

An auxiliary drive gear 50 which is integrally provided to the above-mentioned shaft member 47' is meshed with an idle gear 72 which has an axis parallel to the crankshaft 11 and is rotatably supported on a support shaft 71 which is mounted in an erected manner on an outer surface of the crankcase 14, and the idle gear 72 is meshed with a driven gear 73 which is integrally formed on a rotary shaft 75 of a water pump 74.

On an outer surface of a rear portion of the crankcase 14, a cover 76 which covers a vibration suppressor 45', the above-mentioned idle gear 72 and the above-mentioned driven gear 73 in a cooperative manner with the crankcase 14 is detachably mounted by fastening using a plurality of bolts 77. To the cover 76, an inner stator 79 which constitutes a generator 80 in a cooperative manner with an outer rotor 78 which is fixed to the other end of the above-mentioned shaft member 47' is fixed in a state that the inner stator 79 is surrounded by the outer rotor 78.

Here, a pump housing 81 of the water pump 74 includes a housing main portion 82 and a pump cover 83 which is joined to the housing main portion 82 using a plurality of bolts 84, wherein a cylindrical support sleeve portion 82a which surrounds the above-mentioned rotary shaft 75 coaxially is integrally formed on the housing main portion 82 in a projecting manner.

On the other hand, the above-mentioned cover 76 is integrally provided with a fitting sleeve portion 85 which allows the above-mentioned support sleeve portion 82a to be fitted hermetically therein, and a pump mounting portion 86 which mounts the pump housing 81 thereon while bringing the housing main portion 82 into contact with the pump mounting portion 86 around the support sleeve portion 82a. The pump 81 is mounted on the pump mounting portion 86 using bolts not shown in the drawing.

The rotary shaft 75 coaxially penetrates the above-mentioned support sleeve portion 82a hermetically and rotatably, wherein one end of the rotary shaft 75 is rotatably supported on the crankcase 14 by way of a ball bearing 87 and an impeller 89 is fixed to the other end of the rotary shaft 75 which faces a pump chamber 88 formed in the inside of the pump housing 81.

Here, between both weights 46, 46 of the above-mentioned vibration suppressor 45' and the outer rotor 78 which constitutes a portion of the generator 80 and is fixed to the other end of the shaft member 47', a pulser 91 is fixed to the above-mentioned shaft member 47', while a plurality of maintenance holes 92, 93 which are spaced apart in the circumferential direction are formed in the pulser 91 and the above-mentioned outer rotor 78 in a state that the plurality of maintenance holes 92, 93 correspond to the pins 48 of the vibration suppressor 45'.

The second embodiment can obtain not only advantageous effects substantially equal to the advantageous effects of the above-mentioned first embodiment but also can obtain the following advantageous effect. That is, the vibration suppressor 45' is covered with the cover 76 which integrally includes the pump mounting 86 for mounting the pump housing 81 which is provided to the water pump 74 driven by the crankshaft 11 and the above-mentioned crankcase 14 and hence, it is possible to protect the vibration suppressor 45' while reducing the number of parts.

Further, in a state that the cover 76 is removed from the crankcase 14, it is possible to perform the mounting and dismounting manipulation of the pins 48 of the vibration suppressor 45' by way of the plurality of maintenance holes 92, 93 formed in the above-mentioned pulser 91 and the outer rotor 78 from the outside and hence, it is possible to easily exchange the pins 48 which differ in the outer diameter for changing the order of vibration.

Although the embodiments of the present invention have been explained heretofore, the present invention is not limited to the above-mentioned embodiments and various modifications can be made without departing front the present invention described in claims.

We claim:

1. A vibration prevention structure in an engine, comprising:
   at least two bearing portions mounted on a crankcase, said at least two bearing portions rotatably supporting at least a pair of crank journals of a crankshaft, both ends of the crankshaft projecting from the outermost bearing portions which are arranged along an axis of the crankshaft out of respective bearing portions, wherein a vibration suppressor is provided with a pair of vibration pendulum type weights arranged outside the crankcase and is mounted on an end portion of the crankshaft, and wherein a cover which covers the vibration suppressor cooperatively with the crankcase is detachably mounted on the crankcase, and a support portion which rotatably supports the vibration suppressor mounted on the other end side of the crankshaft is mounted on the cover.

2. A vibration prevention structure in an engine according to claim 1, wherein the orders of vibration of both weights are set different from each other.

3. A vibration prevention structure in an engine, comprising: at least two bearing portions mounted on a crankcase, said at least two bearing portions rotatably supporting at least a pair of crank journals of a crankshaft, both ends of the crankshaft projecting from the outermost bearing portions which are arranged along an axis of the crankshaft out of respective bearing portions, wherein a vibration suppressor is provided with a pair of vibration pendulum type weights arranged outside the crankcase and is mounted on an end portion of the crankshaft, and wherein on the crankcase, a cover which integrally includes a pump mounting portion for mounting a pump housing which is provided to a water pump driven by the crankshaft is detachably mounted, and the vibration suppressor is covered with the crankcase and the cover.

4. A vibration prevention structure in an engine according to claim 3, wherein the orders of vibration of both weights are set different from each other.

5. A vibration prevention structure in an engine, comprising: at least two bearing portions mounted on a crankcase, said at least two bearing portions rotatably supporting at least a pair of crank journals of a crankshaft, both ends of the crankshaft projecting from the outermost bearing portions which are arranged along an axis of the crankshaft out of respective bearing portions, wherein a vibration suppressor is provided with a pair of vibration pendulum type weights arranged outside the crankcase and is mounted on an end portion of the crankshaft, and wherein the vibration suppressor is configured such that on a pair of support arm portions which are arranged along one diametrical line of the crankshaft and are integrally rotated with the crankshaft, the pair of weights are supported by the way of pins which have axes thereof arranged in parallel with the crankshaft and are inserted into the support arm portions and the weights, and removal prevention members which prevent the removal of the pins from the support arm portions are detachably mounted on the weights.

6. A vibration prevention structure in an engine according to claim 5, wherein the orders of vibration of both weights are set different from each other.

* * * * *